US010160328B2

(12) United States Patent
Uneme et al.

(10) Patent No.: US 10,160,328 B2
(45) Date of Patent: Dec. 25, 2018

(54) ELECTRIC VEHICLE

(71) Applicant: HONDA MOTOR CO., LTD., Minato-ku, Tokyo (JP)

(72) Inventors: Takahiro Uneme, Wako (JP); Daisuke Komazawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/846,321

(22) Filed: Dec. 19, 2017

(65) Prior Publication Data

US 2018/0170188 A1 Jun. 21, 2018

(30) Foreign Application Priority Data

Dec. 21, 2016 (JP) ................. 2016-247495

(51) Int. Cl.
| B60L 3/00 | (2006.01) |
| B60L 15/00 | (2006.01) |
| B60K 1/02 | (2006.01) |
| B60L 15/20 | (2006.01) |
| B60K 1/04 | (2006.01) |
| B60L 11/18 | (2006.01) |
| B60K 6/26 | (2007.10) |
| B60K 6/40 | (2007.10) |

(Continued)

(52) U.S. Cl.
CPC .............. B60L 3/0084 (2013.01); B60K 1/02 (2013.01); B60K 1/04 (2013.01); B60L 11/1803 (2013.01); B60L 15/007 (2013.01); B60L 15/20 (2013.01); B60K 6/26 (2013.01); B60K 6/40 (2013.01); B60K 6/44 (2013.01); B60K 6/52 (2013.01); B60K 2001/0416 (2013.01); B60L 2210/12 (2013.01); B60L 2210/14 (2013.01); B60L 2210/30 (2013.01); B60L 2210/40 (2013.01); Y10S 903/906 (2013.01); Y10S 903/916 (2013.01); Y10S 903/951 (2013.01)

(58) Field of Classification Search
CPC .. B60L 3/0084; B60L 15/007; B60L 11/1874; H01M 10/625; H01M 10/6563; B60K 1/02; B60K 6/52

See application file for complete search history.

(56) References Cited

U.S. PATENT DOCUMENTS

| 2002/0023790 A1* | 2/2002 | Hata | ........................ | B60K 6/40 |
| | | | | 180/65.225 |
| 2002/0105188 A1* | 8/2002 | Tomikawa | ............... | B60K 6/44 |
| | | | | 290/40 C |

(Continued)

FOREIGN PATENT DOCUMENTS

JP          2014-221622          11/2014

*Primary Examiner* — Frank B Vanaman
(74) *Attorney, Agent, or Firm* — Amin, Turocy & Watson LLP

(57) ABSTRACT

A power storage unit of an electric vehicle includes a first computer that controls a first traction motor, a second computer that controls a second traction motor, and a support member. The power storage unit is disposed behind a seat of the electric vehicle. In a state that the first computer is fixed to a first surface of the support member and the second computer is fixed to a second surface of the support member, the support member is disposed between the seat and a power storage device in a front-rear direction of the vehicle.

12 Claims, 7 Drawing Sheets

(51) Int. Cl.
*B60K 6/44* (2007.10)
*B60K 6/52* (2007.10)

(56) References Cited

U.S. PATENT DOCUMENTS

| | | | | |
|---|---|---|---|---|
| 2003/0089540 A1* | 5/2003 | Koike | ................. | H01M 2/1055 180/68.5 |
| 2005/0099146 A1* | 5/2005 | Nishikawa | ............... | B60K 6/44 318/63 |
| 2009/0201650 A1* | 8/2009 | Hauser | ................... | A01D 34/78 361/736 |
| 2010/0291427 A1* | 11/2010 | Zhou | ....................... | B60L 11/14 429/100 |
| 2013/0039097 A1* | 2/2013 | Watanabe | ............... | H02M 1/44 363/21.01 |
| 2013/0320677 A1* | 12/2013 | Yamada | ............. | H02M 3/1584 290/45 |
| 2014/0374181 A1* | 12/2014 | Karashima | ............... | B60K 1/04 180/68.5 |
| 2015/0246606 A1* | 9/2015 | Katayama | ................ | B60K 1/04 180/65.1 |

* cited by examiner

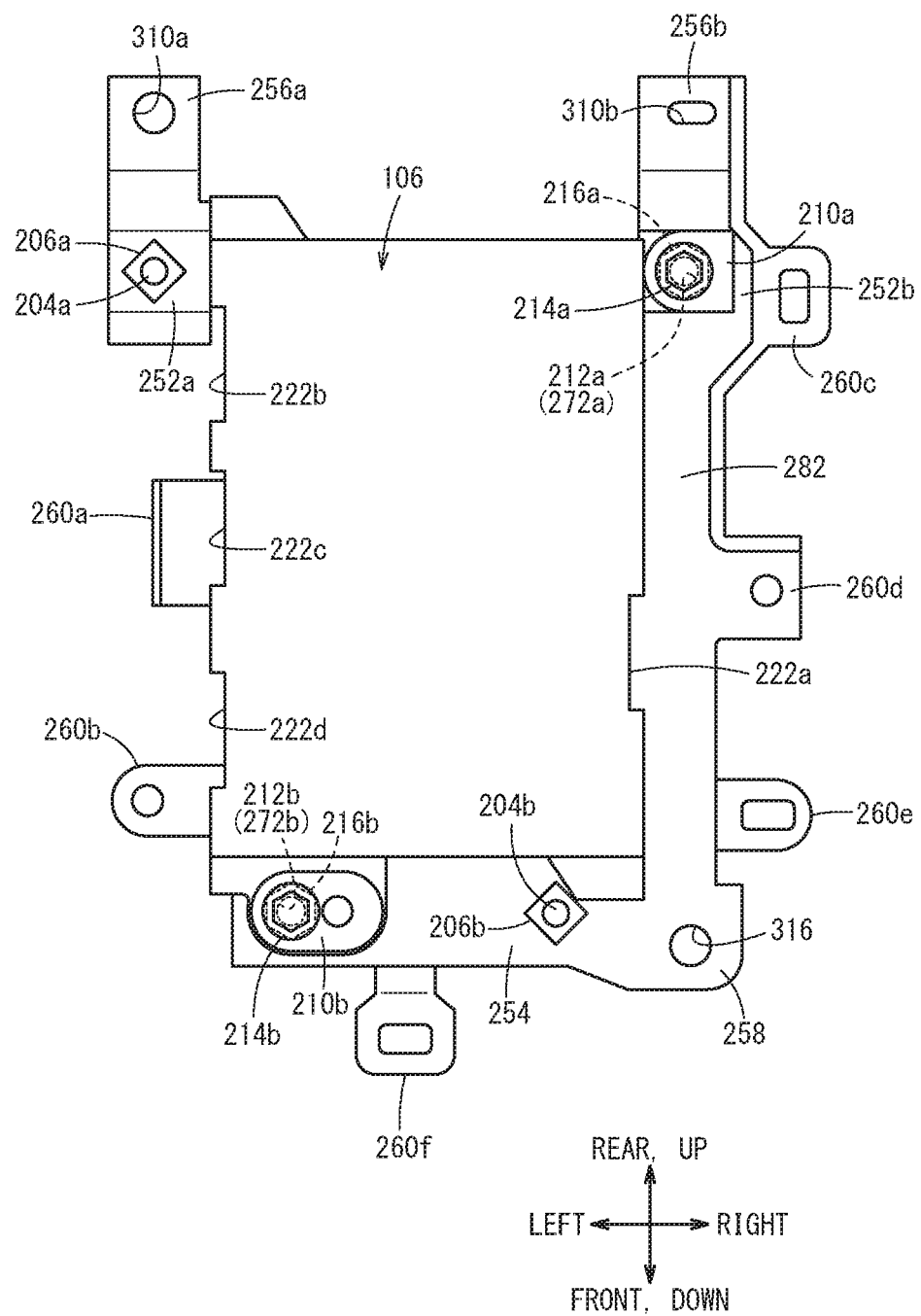

ELECTRIC VEHICLE

CROSS-REFERENCE TO RELATED APPLICATION

This application is based upon and claims the benefit of priority from Japanese Patent Application No. 2016-247495 filed on Dec. 21, 2016, the contents of which are incorporated herein by reference.

BACKGROUND OF THE INVENTION

Field of the Invention

The present invention relates to an electric vehicle including a plurality of traction motors.

Description of the Related Art

In Japanese Laid-Open Patent Publication No. 2014-221622 (hereinafter referred to as "JP 2014-221622 A"), an object is to prevent damage of a high-voltage member when a rear end collision of a vehicle occurred (paragraph [0005], Abstract). In order to achieve the object, in JP 2014-221622 A (Abstract), a battery pack 12 is mounted in a concave part 11a formed in a rear part of a vehicle body of the vehicle. The battery pack 12 includes a battery module 20, a front holding member 15 and a rear holding member 16 to hold the battery module 20 therebetween, and a junction board 24 supported by a front surface of the front holding member 15.

The front surface of the front holding member 15 is provided with a pushing member 56, and the size of the pushing member 56 is larger than that of the junction board 24 in the front-rear direction. In the occurrence of the rear end collision, a frame 29 of the battery module 20 may push the front holding member 15 to cause the front holding member 15 to advance, and this may cause the junction board 24 to be pushed further between the front holding member 15 and a front wall 11b of the concave part 11a. However, a space is formed because the pushing member 56, which is in contact with the front wall 11b of the concave part 11a, supports itself against the front wall 11b, and by having the junction board 24 in that space, the damage can be prevented.

SUMMARY OF THE INVENTION

As described above, it is an object of JP 2014-221622 A to prevent the damage of the high-voltage member in the occurrence of the rear end collision of the vehicle; however, there is still room for improvement in regard to the battery pack 12 (or power storage unit). For example, the technique of JP 2014-221622 A still has room for improvement in regard to the reduction in size and the number of components in the entire power storage unit.

The present invention has been made in view of the above circumstance, and it is an object of the present invention to provide an electric vehicle having smaller size, fewer components, or the like in the entire power storage unit.

An electric vehicle according to the present invention includes: a first traction motor; a second traction motor; and a power storage unit configured to supply electric power to the first traction motor and the second traction motor, the power storage unit including: a power storage device; a first computer configured to control the first traction motor; a second computer configured to control the second traction motor; and a support member including a first surface and a second surface opposite to the first surface, wherein: the power storage unit is disposed behind a seat of the electric vehicle; and in a state that the first computer is fixed to the first surface of the support member and the second computer is fixed to the second surface, the support member is disposed between the seat and the power storage device in a front-rear direction of the electric vehicle.

According to the present invention, both the first computer and the second computer are fixed to one support member. Therefore, as compared to a case in which the first computer and the second computer are fixed to separate support members, the number of components can be reduced and the space can be saved.

In addition, in a case where the seat is inclined in the front-rear direction of the vehicle and the power storage device has an approximately rectangular parallelepiped shape (at least a surface of the power storage device on the seat side is approximately vertical), a space is formed between the seat and the power storage device. According to the present invention, the first computer and the second computer fixed to the support member are disposed between the seat and the power storage device in the front-rear direction of the vehicle. Therefore, also by disposing the first computer and the second computer in the space between the seat and the power storage device, the space can be saved.

Further, when a large external force is applied to the power storage unit from behind the vehicle, for example, in the state that the first computer and the second computer fixed to the support member are disposed between the seat and the power storage device, the first computer and the second computer are crushed before the other components (such as a power conversion device). This makes it easier to protect the other components.

The power storage unit may include a power conversion device configured to convert electric power output from the power storage device. The power conversion device may be disposed on an upper side of the power storage device. Thus, when a large external force is applied to the power conversion device from behind the vehicle, for example, the power conversion device can be protected easily because the power conversion device can move upward.

The support member may be a conductive bracket. The first computer and the second computer may be configured to be grounded through the bracket. The bracket may be configured to be grounded to a vehicle body directly or indirectly. Thus, the first computer and the second computer can be grounded through the common bracket. This can simplify the structure for grounding. In addition, since the grounding is commonly performed, the reference potential is less likely to vary between the signal from the first computer to the first traction motor and the signal from the second computer to the second traction motor. Therefore, the difference in behavior between the first traction motor and the second traction motor due to the variation in reference potential can be suppressed.

The support member may be hollow. This can make the support member lighter in weight.

The first computer and the second computer may have a rectangular parallelepiped shape. The support member may include a plate-shaped part including the first surface and the second surface. The first surface of the plate-shaped part may include two first attachment holes configured to attach the first computer. The second surface of the plate-shaped part may include two second attachment holes configured to attach the second computer. The first attachment holes may be disposed at opposite corner positions. The second attachment holes may be disposed at opposite corner positions.

Since this arrangement makes each of the first computer and the second computer fixed at two positions, the number of first attachment holes and second attachment holes can be made relatively small. By providing fewer first attachment holes and second attachment holes to the support member, the support member can have higher rigidity.

Each of the plate-shaped part of the support member, the first computer, and the second computer may be inclined so that a lower part thereof comes to a front side of the electric vehicle more than an upper part thereof. Thus, in a case where the seat is inclined so as to be positioned more to the rear in the vehicle as going upward, each of the plate-shaped part of the support member, the first computer, and the second computer can be disposed along the seat. As a result, each of the plate-shaped part of the support member, the first computer, and the second computer can be disposed close to the seat. Thus, the space required for the power storage unit can be reduced and accordingly, the room space of the car or the trunk can be expanded.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a perspective view illustrating the second motor electronic control unit and its periphery in the embodiment.

DESCRIPTION OF THE PREFERRED EMBODIMENTS

A. Embodiment
<A-1. Entire Structure>
[A-1-1. Summary]

Figure 1:
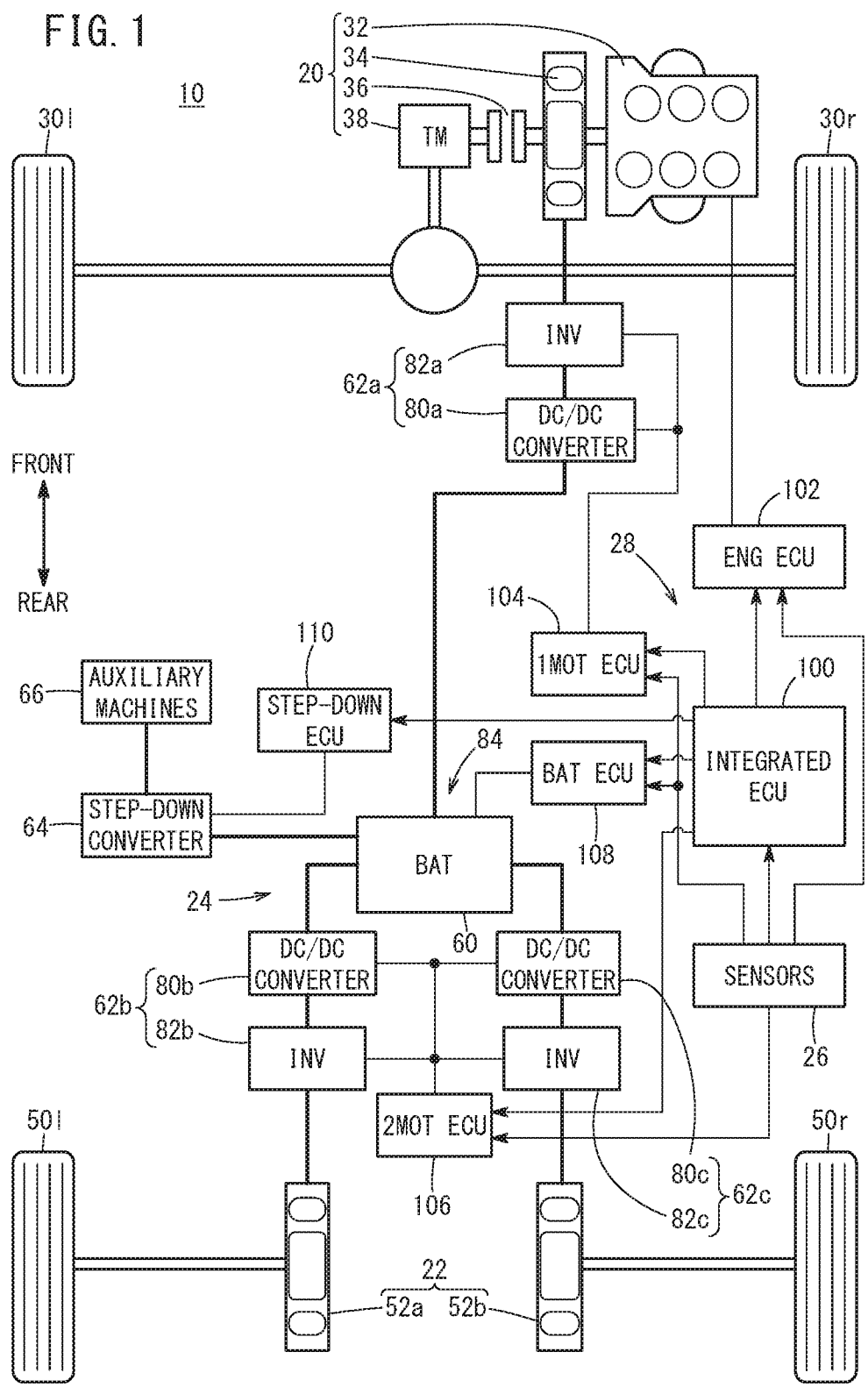
FIG. 1 is a schematic structure diagram of a part of an electric vehicle according to one embodiment of the present invention.

FIG. 1 is a schematic structure diagram of a part of an electric vehicle 10 (hereinafter also referred to as "vehicle 10") according to one embodiment of the present invention. The vehicle 10 includes a front-wheel driving device 20, a rear-wheel driving device 22, an electric power system 24, sensors 26, and a control system 28.

The front-wheel driving device 20 drives a left front wheel 30*l* and a right front wheel 30*r* (hereinafter these wheels are collectively referred to as "front wheels 30"). The front-wheel driving device 20 includes an engine 32, a first traction motor 34 (hereinafter also referred to as "first motor 34" or "motor 34"), a clutch 36, and a transmission 38.

The rear-wheel driving device 22 drives a left rear wheel 50*l* and a right rear wheel 50*r* (hereinafter these wheels are referred to as "rear wheels 50*l*, 50*r*" or collectively "rear wheels 50"). The rear-wheel driving device 22 includes two second traction motors 52a, 52b (hereinafter also referred to as "second motors 52a, 52b" or "motors 52a, 52b"). The front-wheel driving device 20 and the rear-wheel driving device 22 are disconnected from each other mechanically and provided independently.

The electric power system 24 is to supply electric power to the first traction motor 34 and the second traction motors 52a, 52b, and includes a high-voltage battery 60, power control units 62a, 62b, 62c (hereinafter referred to as "PCUs 62a, 62b, 62c"), a step-down converter 64, and auxiliary machines 66. As illustrated in FIG. 1, the PCUs 62a, 62b, 62c include DC/DC converters 80a, 80b, 80c and inverters 82a, 82b, 82c, respectively.

The control system 28 controls the motive power of the engine 32, the first traction motor 34, and the second traction motors 52a, 52b. The control system 28 includes an integrated electronic control unit 100, an engine electronic control unit 102, a first motor electronic control unit 104, a second motor electronic control unit 106, a battery electronic control unit 108, and a step-down electronic control unit 110. In the following description, the integrated electronic control unit 100 is referred to as "integrated ECU 100" or "ECU 100". The engine electronic control unit 102 is referred to as "engine ECU 102", "ENG ECU 102" or "ECU 102". The first motor electronic control unit 104 is referred to as "first motor ECU 104", "motor ECU 104", "1MOT ECU 104", or "ECU 104". The second motor electronic control unit 106 is referred to as "second motor ECU 106", "motor ECU 106", "2MOT ECU 106", or "ECU 106". The battery electronic control unit 108 is referred to as "battery ECU 108", "BAT ECU 108", or "ECU 108". The step-down electronic control unit 110 is referred to as "step-down ECU 110" or "ECU 110".

In the present embodiment, the high-voltage battery 60, the step-down converter 64 (high-voltage component), the 1MOT ECU 104, the 2MOT ECU 106, and the BAT ECU 108 form a battery unit 84 (power storage unit) that supplies electric power to the first traction motor 34 and the second traction motors 52a, 52b.

[A-1-2. Front-Wheel Driving Device 20]

For example, the front-wheel driving device 20 performs driving with only the engine 32 under a middle load, and performs driving with the engine 32 and the first motor 34 under a high load. The front-wheel driving device 20 may perform driving with only the first motor 34 when the vehicle 10 is under a low load.

The engine 32 is, for example, a six-cylinder engine but may alternatively be, for example, a two-cylinder, four-cylinder, or eight-cylinder engine. The engine 32 is not limited to a gasoline engine and may be another engine such as a diesel engine. The engine 32 and the first traction motor 34 are disposed in an engine room (not shown) provided on the front side of the vehicle 10.

The first traction motor 34 generates traveling power for the vehicle 10, and generates electric power by the motive power of the engine 32. In addition, the first traction motor 34 performs cranking to rotate a crank shaft, which is not shown, of the engine 32 when the engine 32 is started.

The first motor 34 is, for example, a three-phase alternating-current brushless type; however, the first motor 34 may be a three-phase alternating-current brush type, a single-phase alternating-current type, a direct-current type, or another type of motor. The specification of the first motor 34 may be either the same as or different from that of the second motors 52a, 52b. The first motor 34 can generate torque in a direction of forward rotation (rotation to make the vehicle 10 go forward) or torque in a reverse direction (rotation to make the vehicle 10 go backward).

In the following description, the first traction motor 34 is also referred to as a cranking motor 34, a CRK MOT 34, or a motor 34. In the present embodiment, other cranking motor (or cell motor) than the first traction motor 34 is not provided; however, other cranking motor may be provided. The motive power of the engine 32 and the first traction motor 34 is also referred to as a front-wheel motive power.

The clutch 36 is disposed between the transmission 38 and a combination of the engine 32 and the CRK MOT 34. When the clutch 36 is on (in a connected state), the motive power of the engine 32 and the CRK MOT 34 can be transmitted to the front wheels 30 and moreover, the motive power from the front wheels 30 can be transmitted to the CRK MOT 34 and regenerated. When the clutch 36 is off (in a disconnected state), the motive power of the engine 32 and the CRK MOT 34 is not transmitted to the front wheels 30. In this case, the electric power can be generated in the CRK MOT 34 by the motive power of the engine 32.

The transmission 38 in the present embodiment is an automatic transmission. However, the transmission 38 may be another transmission such as a manual transmission.

[A-1-3. Rear-Wheel Driving Device 22]

The second motor 52a has an output shaft connected to a rotation shaft of the left rear wheel 50l, and transmits the driving power to the left rear wheel 50l. The second motor 52b has an output shaft connected to a rotation shaft of the right rear wheel 50r, and transmits the driving power to the right rear wheel 50r. Between the second traction motors 52a, 52b and the rear wheels 50, a clutch and/or a reduction gear that is not shown may be provided.

The second traction motors 52a, 52b generate the traveling power for the vehicle 10 and moreover generate electric power with the motive power from the rear wheels 50. In the following description, the second traction motors 52a, 52b are also referred to as TRC MOTs 52a, 52b or motors 52a, 52b, and are collectively referred to as TRC MOTs 52 or motors 52. In addition, the motive power transmitted from the rear-wheel driving device 22 to the rear wheels 50 is referred to as a rear-wheel motive power.

The second motors 52a, 52b are, for example, a three-phase alternating-current brushless type; however, the second motors 52a, 52b may be a three-phase alternating-current brush type, a single-phase alternating-current type, a direct-current type, or another type of motor. The specification of the second motors 52a, 52b may be either the same as or different from that of the first motor 34.

[A-1-4. Electric Power System 24]

The high-voltage battery 60 supplies electric power to the first motor 34 and the second motors 52a, 52b through the PCUs 62a, 62b, 62c, and is charged with regeneration electric power Preg from the first motor 34 and the second motors 52a, 52b.

The battery 60 is a power storage device (energy storage) including a plurality of battery cells, and may be, for example, a lithium ion secondary battery, a nickel-hydrogen (Nickel-metal hydride) secondary battery, or the like. Instead of the battery 60, a power storage device such as a capacitor can be used. In the present embodiment, a lithium ion secondary battery is used. The battery 60 in the present embodiment has a rectangular parallelepiped shape but may alternatively have another shape such as a cylindrical shape.

The DC/DC converters 80a, 80b, 80c (power conversion devices) step up or elevate the output voltage of the battery 60 and step down the output voltage of the first motor 34 and the second motors 52a, 52b.

The first to third inverters 82a, 82b, 82c (power conversion devices) have a three-phase full-bridge structure and perform DC/AC conversion. That is to say, the first to third inverters 82a, 82b, 82c convert the direct current into three-phase alternating current, and supply the alternating current to the first motor 34 and the second motors 52a, 52b, respectively. The first to third inverters 82a, 82b, 82c supply to the battery 60, the direct current after the AC/DC conversion obtained by the regeneration operation of the first motor 34 and the second motors 52a, 52b, respectively.

The step-down converter 64 (power conversion device) converts the output voltage of the high-voltage battery 60 on the basis of the instruction from the step-down ECU 110. Specifically, the step-down converter 64 steps down the output voltage of the battery 60, and supplies the voltage to the auxiliary machines 66. The auxiliary machines 66 include, for example, a low-voltage battery, a headlight, or the like that is not shown.

[A-1-5. Sensors 26]

The sensors 26 include, for example, an accelerator pedal sensor, a vehicle speed sensor, an engine rotational speed sensor, an engine torque sensor, a shift position sensor, an SOC sensor, a battery temperature sensor, a battery voltage sensor, and a battery current sensor.

The accelerator pedal sensor detects the amount of operation θap [%] of the accelerator pedal (hereinafter also referred to as "AP operation amount θap"). The vehicle speed sensor detects the vehicle speed V [km/h] of the vehicle 10. The engine rotational speed sensor detects the engine rotational speed Ne [rpm] corresponding to the number of rotations of the engine per unit time. The engine torque sensor detects the torque Teng generated by the engine 32 (hereinafter referred to as "engine torque Teng" or "engine generation torque Teng"). The shift position sensor detects the shift position Ps. The shift position Ps includes a gear position of the transmission 38.

The battery temperature sensor detects the temperature Hbat of the battery 60 (hereinafter also referred to as "battery temperature Hbat"). The SOC sensor detects the SOC (state of charge) of the battery 60. The battery voltage sensor detects the input/output voltage Vbat of the battery 60 (hereinafter also referred to as "voltage Vbat" or "battery voltage Vbat"). The battery current sensor detects the input/output current Ibat of the battery 60 (hereinafter also referred to as "current Ibat" or "battery current Ibat"). The temperature Hbat, the voltage Vbat, and the current Ibat of the battery 60 are used to, for example, calculate the discharge limitation value Pbat_lim (output limit) of the battery 60.

[A-1-6. Control System 28]

The integrated ECU 100 is to control the entire vehicle 10, and in the present embodiment, for example, controls the ENG ECU 102, the motor ECUs 104, 106, the BAT ECU 108, and the step-down ECU 110. The engine ECU 102 controls the engine 32 on the basis of the instruction from the integrated ECU 100, or the like.

The first motor ECU 104 controls the first traction motor 34 on the basis of the instruction from the integrated ECU 100, or the like. Specifically, the motor ECU 104 controls the step-up ratio of the converter 80a so that the output voltage of the DC/DC converter 80a becomes the voltage requested by the first motor 34. The step-up ratio of the converter 80a is controlled by changing the duty ratio of the drive signal relative to a switching element (not shown) of the converter 80a. In addition, the motor ECU 104 controls the duty ratio relative to a switching element (not shown) of the inverter 82a so that a passing current of the inverter 82a becomes the current requested by the first motor 34.

The second motor ECU 106 controls the second traction motors 52a, 52b on the basis of the instruction from the integrated ECU 100, or the like. Specifically, the motor ECU 106 controls the step-up ratio of the converters 80b, 80c so that the output voltages of the DC/DC converters 80b, 80c become the voltages requested by the second motors 52a, 52b. In addition, the motor ECU 106 controls the duty ratio of a switching element (not shown) of the inverters 82b, 82c so that passing currents of the inverters 82b, 82c become the currents requested by the second motors 52a, 52b.

The battery ECU 108 controls the high-voltage battery 60 on the basis of the instruction from the integrated ECU 100, or the like. For example, the battery ECU 108 monitors the output of the battery 60 so that the output of the battery 60 does not exceed the discharge limitation value Pbat_lim. If the output of the battery 60 exceeds the discharge limitation value Pbat_lim, the ECU 108 stops the output from the battery 60. The step-down ECU 110 controls the step-down converter 64 on the basis of the instruction from the integrated ECU 100, or the like. Specifically, the step-down ECU 110 controls the step-down converter 64 so that the output voltage of the battery 60 becomes a predetermined low voltage (for example, 12 V).

Each of the ECUs 100, 102, 104, 106, 108, 110 has an input/output unit, a calculation unit, and a storage unit that are not shown. The input/output unit is to input and output signals between the ECUs 100, 102, 104, 106, 108, 110 and other units (including other ECUs). The input/output unit may include an operation input/output device (human-machine interface, HMI) for an occupant (including a driver).

The calculation unit achieves the function of each of the ECUs 100, 102, 104, 106, 108, 110 (i.e., performs various processes) by executing programs stored in the storage unit, and includes, for example, a central processing unit (CPU).

The storage unit stores programs and data used by the calculation unit. The storage unit includes, for example, a random access memory (hereinafter referred to as "RAM"). As the RAM, a volatile memory such as a register and a nonvolatile memory such as a flash memory can be used. In addition to the RAM, the storage unit may include a read only memory (hereinafter referred to as "ROM").

In the present embodiment, it is assumed that the programs and data used by the calculation unit are stored in the storage unit of the vehicle 10. However, for example, a part of the programs and data may be obtained from an external server (not shown) through a wireless device (not shown) included in the input/output unit.

In the present embodiment, the ECUs 100, 102, 104, 106, 108, 110 are defined as above; however, the ECUs 100, 102, 104, 106, 108, 110 may be structured based on other definition (combination).

Figure 5:
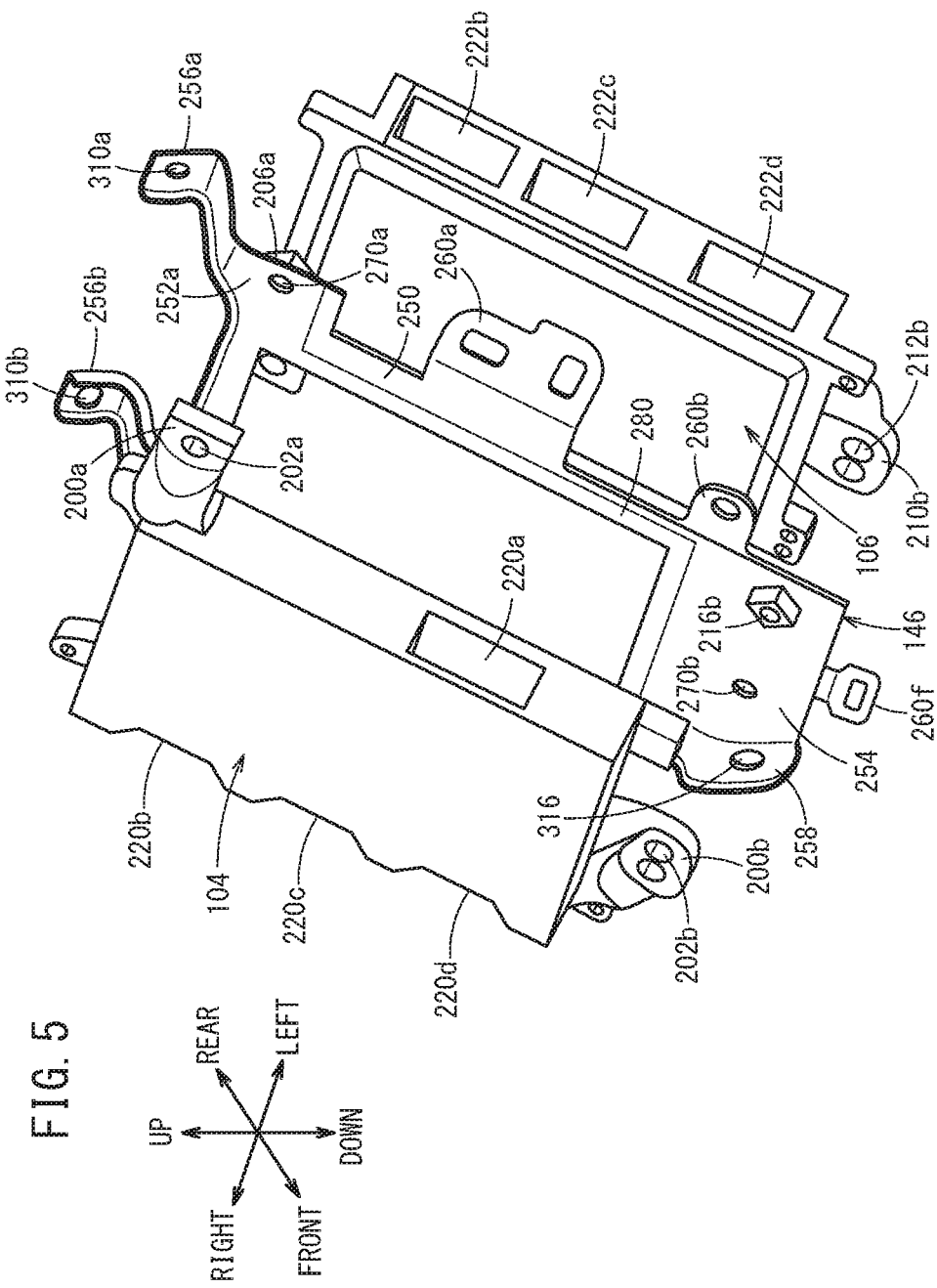
FIG. 5 is an exploded perspective view illustrating a bracket, a first motor electronic control unit, and a second motor electronic control unit in the embodiment.
Figure 6:
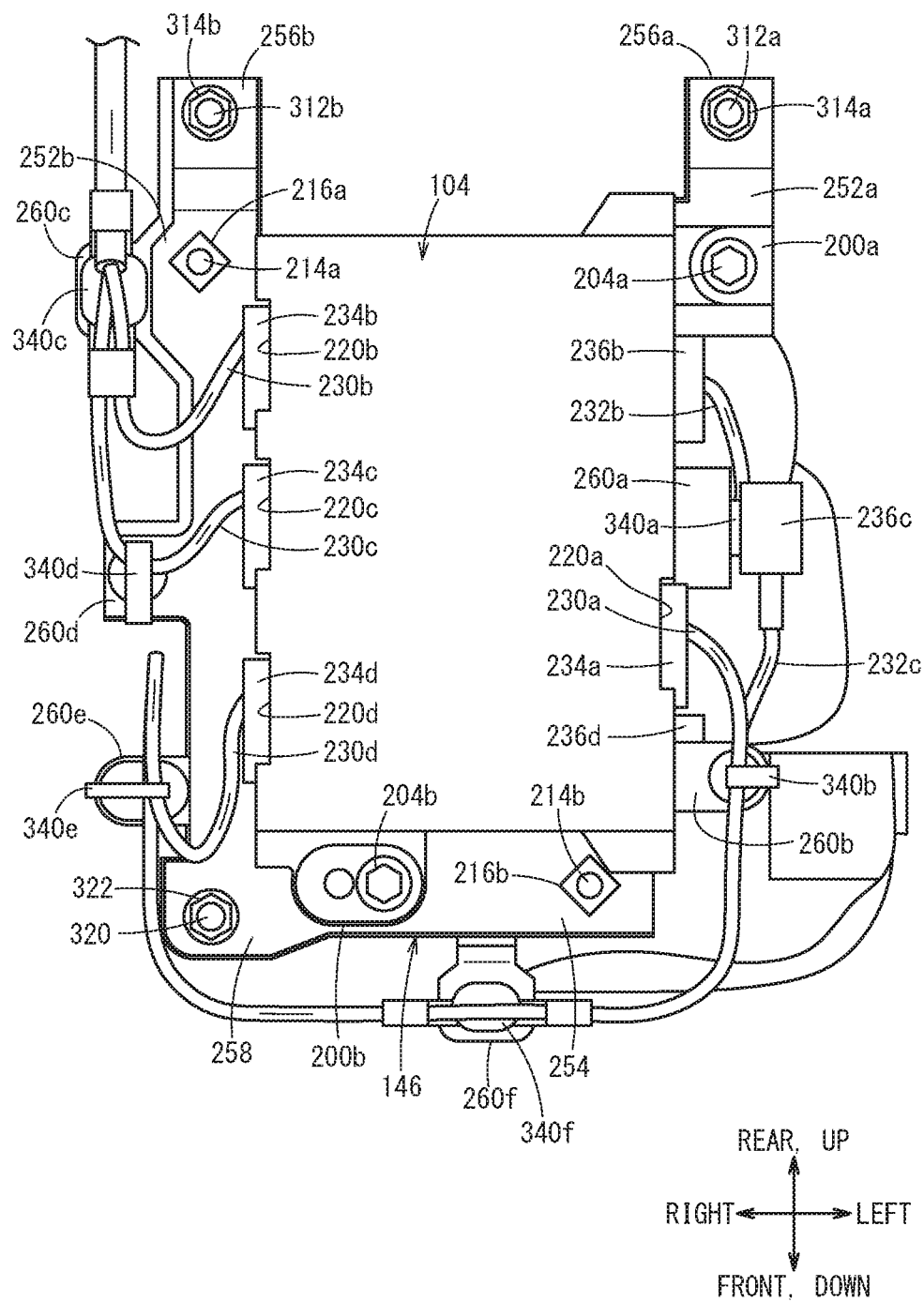
FIG. 6 is a perspective view illustrating the first motor electronic control unit and its periphery in the embodiment.

The ECUs 100, 102, 104, 106, 108, 110 (their housings) in the present embodiment have an approximately rectangular parallelepiped shape (for example, in regard to the first motor ECU 104 and the second motor ECU 106, see FIG. 5 to FIG. 7). Alternatively, the ECUs 100, 102, 104, 106, 108, 110 may have a different shape.

<A-2. Specific Structure and Arrangement of Battery Unit 84>

[A-2-1. Summary]

Figure 2:
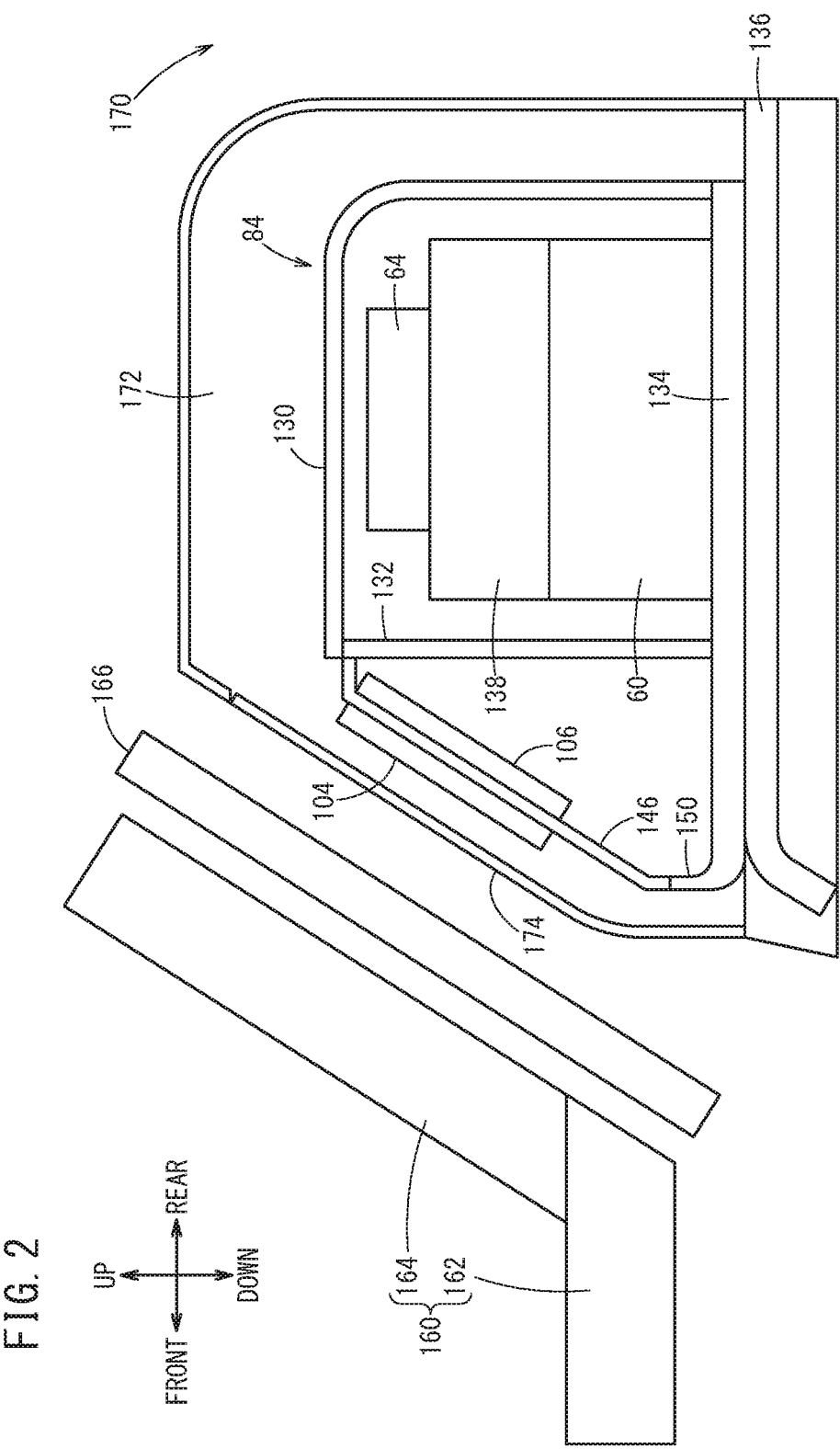
FIG. 2 is a side cross-sectional view illustrating the arrangement of a battery unit in the electric vehicle according to the embodiment in a simplified manner.
Figure 3:
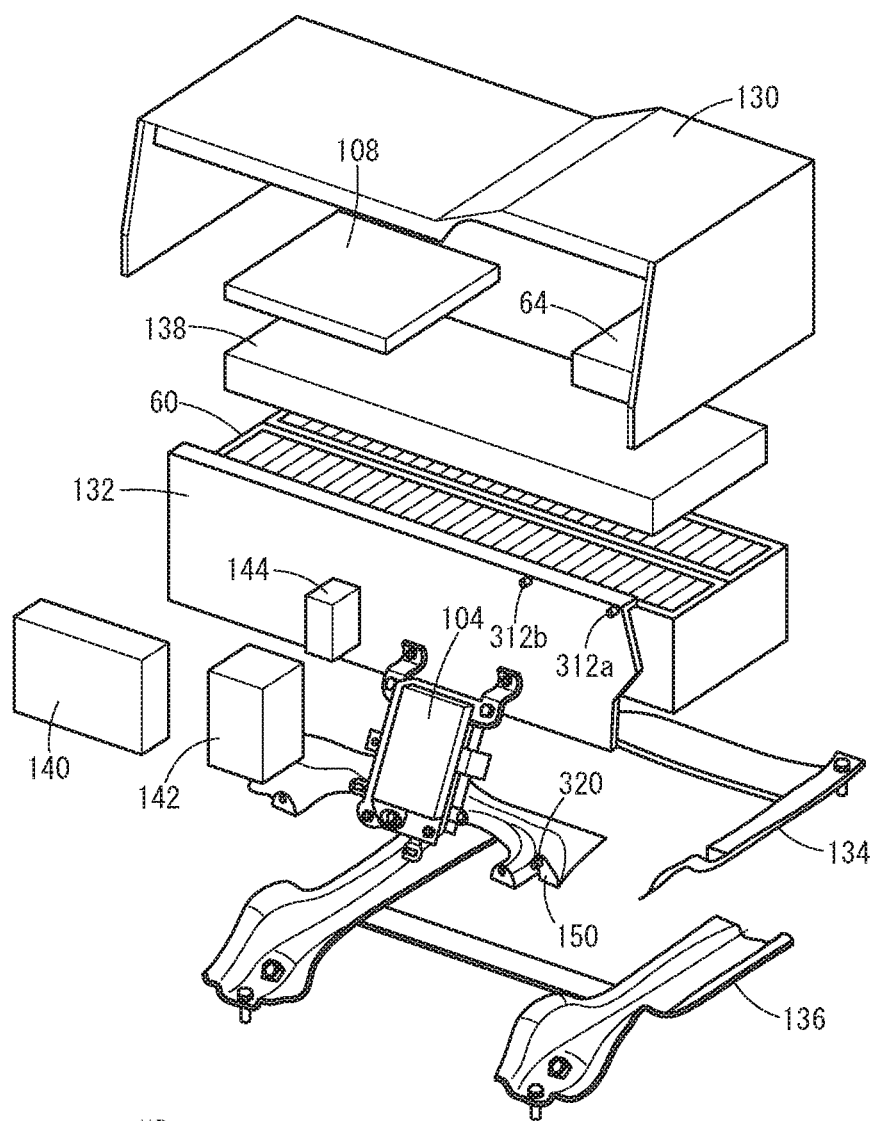
FIG. 3 is an exploded perspective view illustrating the battery unit in the embodiment in a simplified manner.
Figure 4:
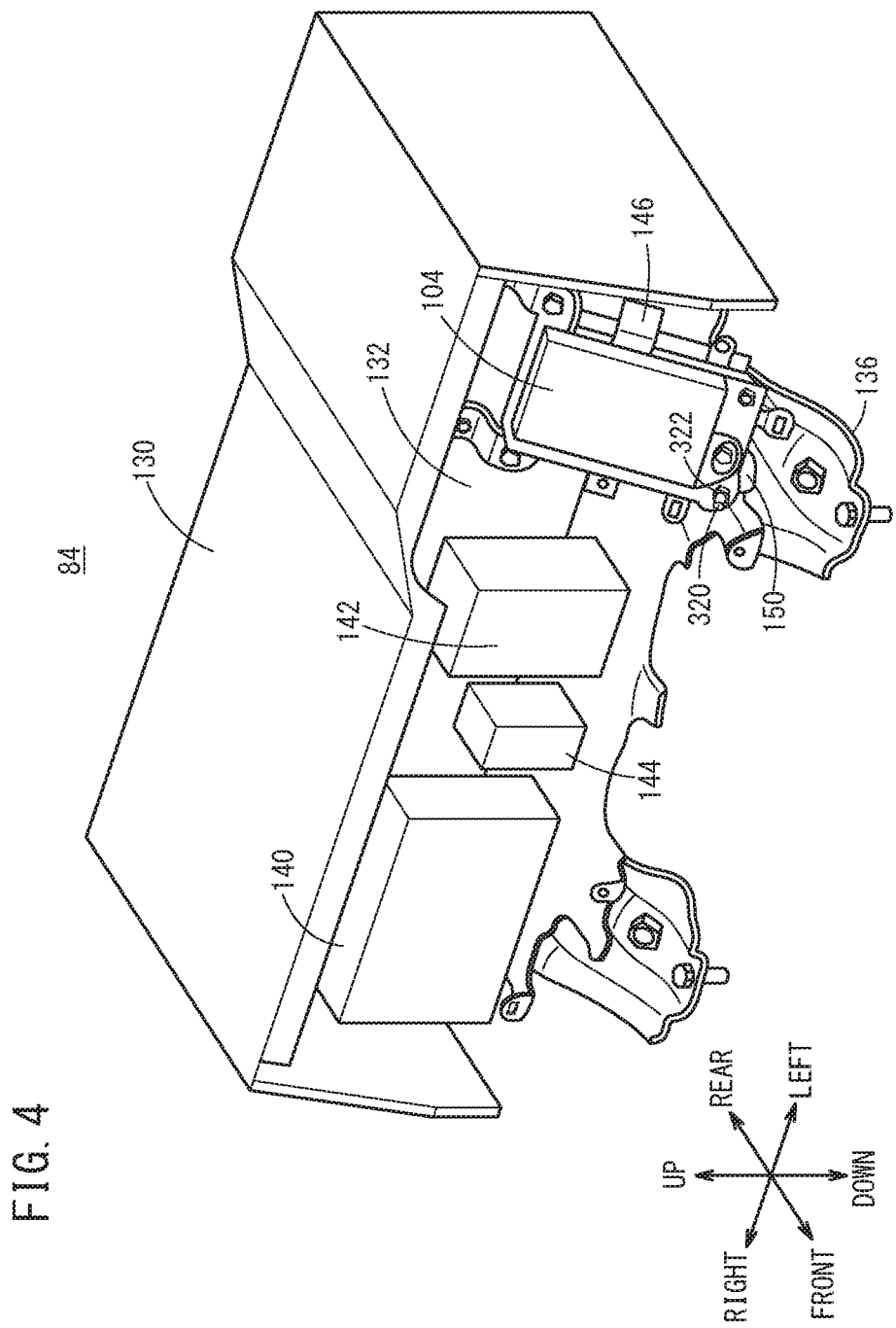
FIG. 4 is a perspective view illustrating an external appearance of the battery unit in the embodiment in a simplified manner.

FIG. 2 is a side cross-sectional view illustrating the arrangement of the battery unit 84 in the electric vehicle 10 according to the present embodiment in a simplified manner. The front-rear and left-right directions in FIG. 2 correspond to the front-rear and left-right directions of the vehicle 10 (this similarly applies to FIG. 3 to FIG. 7). FIG. 3 is an exploded perspective view illustrating the battery unit 84 in the present embodiment in a simplified manner. FIG. 4 is a perspective view illustrating an external appearance of the battery unit 84 in the present embodiment in a simplified manner.

As described above, the battery unit 84 includes the high-voltage battery 60, the step-down converter 64, the 1MOT ECU 104, the 2MOT ECU 106, and the BAT ECU 108. In addition to these, as illustrated in FIG. 2 to FIG. 4, the battery unit 84 includes an upper unit cover 130, a front battery frame 132, a lower battery frame 134, a lower unit frame 136, a duct 138, a first junction box 140, a second junction box 142, a service plug 144, and a bracket 146. The lower battery frame 134 has a bracket fixing part 150. Further, the battery unit 84 can include the SOC sensor, the battery temperature sensor, the battery voltage sensor, the battery current sensor, and the like that are described above.

The electric components (such as the high-voltage battery 60 and the step-down converter 64) are connected to each other through the first junction box 140, the second junction box 142, or the like. The bracket 146 fixes or supports the 1MOT ECU 104 and the 2MOT ECU 106 (the details will be described below).

As illustrated in FIG. 2, the battery unit 84 (including the high-voltage battery 60) is disposed behind a seat 160 (a cushion 162 and a backrest 164). Between the battery unit 84 and the seat 160, a bulk head 166 is disposed. Behind the battery unit 84, a trunk 170 is disposed. When the battery unit 84 is assembled to the vehicle 10, the battery unit 84 is moved from the seat 160 side to the trunk 170 side, specifically into a battery unit placement space 172, and then the battery unit 84 is fixed to the vehicle 10 with a bolt or the like that is not shown. After the battery unit 84 is fixed, a front cover 174 is closed.

As illustrated in FIG. 2 and FIG. 3, the step-down converter 64 (power conversion device) is disposed above (on an upper side of) the high-voltage battery 60 with a rectangular parallelepiped shape through the duct 138.

In addition, as illustrated in FIG. 2 to FIG. 4, the 1MOT ECU 104 and the 2MOT ECU 106 are disposed on the front side of the battery 60 in a state that the 1MOT ECU 104 and the 2MOT ECU 106 are fixed to the bracket 146. In other words, the bracket 146 (support member) is disposed between the seat 160 and the battery 60 in the front-rear direction of the vehicle 10. The bracket 146 (particularly, a plate-shaped part 250 (FIG. 5) to be described below), the first motor ECU 104, and the second motor ECU 106 are inclined so that a lower part thereof comes to the front side of the vehicle 10 more than an upper part thereof. In particular, in the present embodiment, the bracket 146 (particularly, the plate-shaped part 250 to be described below), the first motor ECU 104, and the second motor ECU 106 are approximately parallel to the backrest 164. This enables the bracket 146, the first motor ECU 104, and the second motor ECU 106 to come close to the backrest 164 and the bulk head 166 easily.

[A-2-2. First Motor ECU 104 and Second Motor ECU 106]

FIG. 5 is an exploded perspective view illustrating the bracket 146, the first motor ECU 104, and the second motor ECU 106. FIG. 6 is a perspective view illustrating the first motor ECU 104 and its periphery in the present embodiment. FIG. 7 is a perspective view illustrating the second motor ECU 106 and its periphery in the present embodiment. Note that in FIG. 5 to FIG. 7, the peripheral component is omitted as necessary.

As illustrated in FIG. 5 to FIG. 7, the first motor ECU 104 and the second motor ECU 106 have an approximately rectangular parallelepiped shape.

As illustrated in FIG. 5 and FIG. 6, the first motor ECU 104 is provided with first bracket fixing parts 200a, 200b. The first bracket fixing part 200a is a part to fix the first motor ECU 104 to the bracket 146 on an upper side, and is provided with a first bracket fixing hole 202a. The first bracket fixing part 200b is a part to fix the first motor ECU 104 to the bracket 146 on a lower side, and is provided with a first bracket fixing hole 202b. By the engagement between a bolt 204a and a nut 206a through the first bracket fixing hole 202a and a first bolt hole 270a of the bracket 146 (which will be described below), the first bracket fixing part 200a is fixed to the bracket 146. Similarly, by the engagement between a bolt 204b and a nut 206b through the first bracket fixing hole 202b and a first bolt hole 270b of the bracket 146 (which will be described below), the first bracket fixing part 200b is fixed to the bracket 146. This causes the first motor ECU 104 to be grounded through the bracket 146.

As illustrated in FIG. 5 and FIG. 7, the second motor ECU 106 is provided with two second bracket fixing parts 210a, 210b. The second bracket fixing part 210a is a part to fix the second motor ECU 106 to the bracket 146 on an upper side, and is provided with a second bracket fixing hole 212a. The second bracket fixing part 210b is a part to fix the second motor ECU 106 to the bracket 146 on a lower side, and is provided with a second bracket fixing hole 212b. By the engagement between a bolt 214a and a nut 216a through the second bracket fixing hole 212a and a second bolt hole 272a of the bracket 146 (which will be described below), the second bracket fixing part 210a is fixed to the bracket 146. Similarly, by the engagement between a bolt 214b and a nut 216b through the second bracket fixing hole 212b and a second bolt hole 272b of the bracket 146 (which will be described below), the second bracket fixing part 210b is fixed to the bracket 146. This causes the second motor ECU 106 to be grounded through the bracket 146.

As illustrated in FIG. 5 and FIG. 6, the first motor ECU 104 is provided with a plurality of connectors 220a, 220b, 220c, 220d. As illustrated in FIG. 5 and FIG. 6, one connector 220a is provided on the left side of the first motor ECU 104 (right side in FIG. 6), and three connectors 220b, 220c, 220d are provided on the right side of the first motor ECU 104 (left side in FIG. 6). Similarly, the second motor ECU 106 is provided with a plurality of connectors 222a, 222b, 222c, 222d.

As illustrated in FIG. 6, for example, the connectors 220a to 220d, 222a to 222d are connected to connectors 234a, 234b, 234c, 234d, 236b, 236c, 236d of harnesses 230a, 230b, 230c, 230d, 232b, 232c (the harness and connector for the connector 222a, and the harness of the connector 236d are not shown).

[A-2-3. Bracket 146]

The bracket 146 (support member) according to the present embodiment includes a conductive member. As illustrated in FIG. 5 to FIG. 7, the bracket 146 includes the plate-shaped part 250, two upper ECU fixing parts 252a, 252b, one lower ECU fixing part 254, two upper frame fixing parts 256a, 256b, one lower frame fixing part 258, and six clip fixing parts 260a, 260b, 260c, 260d, 260e, 260f. The upper ECU fixing parts 252a, 252b and the lower ECU fixing part 254 are provided to the plate-shaped part 250. In other words, the upper ECU fixing parts 252a, 252b and the lower ECU fixing part 254 constitute a part of the plate-shaped part 250.

The plate-shaped part 250 is a hollow part with an approximately plate shape, and has a first surface 280 (FIG. 5) as a main plane, and a second surface 282 (FIG. 7) on the opposite side of the first surface 280. Here, the term "hollow" means a shape whose inside is removed. As is clear in FIG. 2, the first surface 280 comes to the seat 160 side.

As illustrated in FIG. 5 to FIG. 7, the upper ECU fixing parts 252a, 252b provided to the plate-shaped part 250 respectively have the first bolt hole 270a (first attachment hole) for attaching the first motor ECU 104 and the second bolt hole 272a (second attachment hole) for attaching the second motor ECU 106. The lower ECU fixing part 254 provided to the plate-shaped part 250 has the two first bolt holes 270b (first attachment holes) for attaching the first motor ECU 104 and the two second bolt holes 272b (second attachment holes) for attaching the second motor ECU 106.

By the engagement between the bolt 204a and the nut 206a through the first bolt hole 270a and the engagement between the bolt 204b and the nut 206b through the first bolt hole 270b, the first motor ECU 104 is fixed to the first surface 280 of the plate-shaped part 250. By the engagement between the bolt 214a and the nut 216a through the second bolt hole 272a and the engagement between the bolt 214b and the nut 216b through the second bolt hole 272b, the second motor ECU 106 is fixed to the second surface 282 of the plate-shaped part 250. Thus, the bracket 146 is held between the first motor ECU 104 and the second motor ECU 106.

As illustrated in FIG. 5, for example, the two first bolt holes 270a, 270b are disposed at opposite corner positions. Similarly, as illustrated in FIG. 7, for example, the two second bolt holes 272a, 272b are disposed at opposite corner positions. To prevent the wrong assembly, the positional relation between the first bolt holes 270a, 270b and the positional relation between the second bolt holes 272a, 272b are different. As a result, the pitch (distance) between the first bolt holes 270a, 270b and the pitch (distance) between the second bolt holes 272a, 272b are different.

The upper frame fixing parts 256a, 256b are used to fix the bracket 146 to the front battery frame 132, and are provided with upper frame fixing holes 310a, 310b. By the engagement between a bolt 312a and a nut 314a through the upper frame fixing hole 310a, the upper frame fixing part 256a is fixed to the front battery frame 132. Similarly, by the engagement between a bolt 312b and a nut 314b through the upper frame fixing hole 310b, the upper frame fixing part 256b is fixed to the front battery frame 132. This causes the first motor ECU 104 and the second motor ECU 106 to be grounded to the vehicle body (not shown) through the bracket 146, the front battery frame 132, the lower battery frame 134, and the like.

The lower frame fixing part 258 is used to fix the bracket 146 to the bracket fixing part 150 (FIG. 2 and FIG. 3) of the lower battery frame 134, and is provided with a lower frame fixing hole 316. By the engagement between a bolt 320 and a nut 322 through the lower frame fixing hole 316, the lower frame fixing part 258 is fixed to the bracket fixing part 150 of the lower battery frame 134.

The clip fixing parts 260a to 260f have clip insertion holes to respectively receive and fix clips 340a, 340b, 340c, 340d, 340e, 340f, which hold the connector 234a, and the harnesses 230a, 230b, 230c, 230d, 232b, 232c. As illustrated in FIG. 6, the harnesses 230a, 232b, 232c connected on the left side of the motor ECUs 104, 106 (right side in FIG. 6) are fixed by the clip 340f below the motor ECUs 104, 106, and extend to the right side of the motor ECUs 104, 106 (left side in FIG. 6). Thus, the harnesses 230a, 232b, 232c are curved to protrude downward (in other words, a U-shape). Accordingly, even if water condensation occurs in the harnesses 230a, 232b, 232c, a water drop will not enter the motor ECUs 104, 106.

<A-3. Effects of the Embodiment>

According to the present embodiment, the 1MOT ECU 104 (first computer) and the 2MOT ECU 106 (second computer) are both fixed to one bracket 146 (support member) (FIG. 2, FIG. 5, etc.). Therefore, as compared to the case where the 1MOT ECU 104 and the 2MOT ECU 106 are fixed to separate brackets 146, the number of components can be reduced and the space can be saved.

In addition, in the case where the seat 160 is inclined in the front-rear direction of the vehicle 10 and the battery 60 (power storage device) has an approximately rectangular parallelepiped shape (at least a surface of the battery 60 on the seat 160 side extends approximately vertically), a space is formed between the seat 160 and the battery 60 (see FIG. 2). According to the present embodiment, the 1MOT ECU 104 and the 2MOT ECU 106 that are fixed to the bracket 146 are disposed between the seat 160 and the battery 60 in the front-rear direction of the vehicle 10 (FIG. 2). Therefore, the space can be saved also by disposing the 1MOT ECU 104 and the 2MOT ECU 106 between the seat 160 and the battery 60.

Further, for example, if a large external force is applied from behind the vehicle 10 to the battery unit 84 (power storage unit) in a state that the 1MOT ECU 104 and the 2MOT ECU 106 fixed to the bracket 146 are disposed between the seat 160 and the battery 60, the 1MOT ECU 104 and the 2MOT ECU 106 are crushed before the other components (such as the step-down converter 64 (power conversion device)). This makes it easier to protect the other components.

In the present embodiment, the battery unit 84 (power storage unit) includes the step-down converter 64 (power conversion device) that converts the electric power output from the battery 60 (power storage device) (FIG. 1 to FIG. 3). The step-down converter 64 is disposed above the battery 60 (FIG. 2 and FIG. 3). Thus, if the large external force is applied from behind the vehicle 10 to the step-down converter 64, for example, the step-down converter 64 can move upward, and this makes it easier to protect the step-down converter 64.

In the present embodiment, the 1MOT ECU 104 (first computer) and the 2MOT ECU 106 (second computer) are grounded through the conductive bracket 146 (FIG. 5, etc.). The bracket 146 is grounded to the vehicle body directly or indirectly (FIG. 3). This enables the 1MOT ECU 104 and the 2MOT ECU 106 to be grounded through the common bracket 146. As a result, the structure for grounding can be simplified. Since the grounding is commonly performed, the reference potential is less likely to vary between the signal from the 1MOT ECU 104 to the first traction motor 34 and the signal from the 2MOT ECU 106 to the second traction motors 52a, 52b. Therefore, the difference in behavior between the first traction motor 34 and the second traction motors 52a, 52b due to the variation in reference potential can be suppressed.

In the present embodiment, the bracket 146 (support member) is hollow (FIG. 5). This can make the bracket 146 lighter in weight.

In the present embodiment, the 1MOT ECU 104 (first computer) and the 2MOT ECU 106 (second computer) have a rectangular parallelepiped shape (FIG. 5, etc.). The bracket 146 (support member) includes the plate-shaped part 250 having the first surface 280 and the second surface 282 (FIG. 5, etc.). At the first surface 280 of the plate-shaped part 250, the two first bolt holes 270a, 270b (first attachment holes) for attaching the 1MOT ECU 104 are formed (FIG. 5). At the second surface 282 of the plate-shaped part 250, the two second bolt holes 272a, 272b (second attachment holes) for attaching the 2MOT ECU 106 are formed (FIG. 7). The first bolt holes 270a, 270b are disposed at opposite corner positions. The second bolt holes 272a, 272b are disposed at opposite corner positions.

Since each of the 1MOT ECU 104 and the 2MOT ECU 106 is fixed at two positions, the number of first bolt holes 270a, 270b and the second bolt holes 272a, 272b can be made relatively small. By providing fewer first bolt holes 270a, 270b and second bolt holes 272a, 272b to the bracket 146, the bracket 146 can have higher rigidity.

In the present embodiment, the plate-shaped part 250 of the bracket 146 (support member), the 1MOT ECU 104 (first computer), and the 2MOT ECU 106 (second computer) are inclined so that a lower part thereof comes to the front side of the vehicle 10 more than an upper part thereof (FIG. 2). Thus, in a case where the seat 160 is inclined so as to be positioned more to the rear in the vehicle 10 as going upward, each of the plate-shaped part 250 of the bracket 146, the 1MOT ECU 104, and the 2MOT ECU 106 can be disposed along the seat 160. As a result, each of the plate-shaped part 250, the 1MOT ECU 104, and the 2MOT ECU 106 can be disposed close to the seat 160. Thus, the space required for the battery unit 84 (power storage unit) can be reduced and accordingly, the room space of the car or the trunk 170 can be expanded.

According to the present embodiment, the 1MOT ECU 104 (first computer) controls the single first traction motor 34, and the 2MOT ECU 106 (second computer) controls the plural second traction motors 52a, 52b (FIG. 1). Therefore, the 2MOT ECU 106 is likely to have more harnesses 230a, 230b, 230c, 230d, 232b, 232c. In addition, in a state that the first surface 280 of the plate-shaped part 250 comes closer to the seat 160 side than the second surface 282 thereof and that the 1MOT ECU 104 is fixed to the first surface 280 and the 2MOT ECU 106 is fixed to the second surface 282, the bracket 146 is disposed between the seat 160 and the battery 60. As a result, the 1MOT ECU 104 is disposed on the upper side and outside the battery unit 84, and the 2MOT ECU 106 is disposed on the lower side and inside the battery unit 84. Therefore, the 2MOT ECU 106 that controls the plural second traction motors 52a, 52b can be disposed closer to other components of the battery unit 84 (such as the battery 60 and the step-down converter 64) more easily. Therefore, the total length of the harnesses 230a, 230b, 230c, 230d of the 1MOT ECU 104 and the total length of the harnesses 232b, 232c of the 2MOT ECU 106 can be shortened.

B. Modification

The present invention is not limited to the aforementioned embodiment and various structures can be employed based on the description of the present specification. For example, a structure below can be employed.

<B-1. Application Object>

In the above embodiment, the vehicle 10 is a hybrid vehicle having the engine 32 and the traction motors 34, 52a, 52b as the driving source (FIG. 1). However, the present invention is not limited to the hybrid vehicle from the viewpoint of using the bracket 146 for fixing the 1MOT ECU 104 and the 2MOT ECU 106, for example. The vehicle 10 may be, for example, a fuel cell vehicle or an electric vehicle (battery vehicle) in a narrow sense, which has at least two traction motors only as the driving source.

In the above embodiment, the battery unit 84 is used for the vehicle 10 (FIG. 2). However, the present invention is not limited to this structure from the viewpoint of using the bracket 146 for fixing the 1MOT ECU 104 and the 2MOT ECU 106, for example. The battery unit 84 can be used for ships, air craft, or other moving bodies (or other vehicles), for example. Alternatively, the battery unit 84 may be used for robots, manufacturing apparatus, or home electrical appliances.

<B-2. Battery Unit 84>

[B-2-1. Entire Battery Unit 84]

In the above embodiment, the step-down converter 64 (power conversion device) is disposed above the battery 60 (FIG. 2). However, the present invention is not limited to this structure from the viewpoint of using the bracket 146 for fixing the 1MOT ECU 104 and the 2MOT ECU 106, for example. The step-down converter 64 may be disposed on the left side or the right side of the battery 60, for example.

In the above embodiment, the battery unit 84 includes the high-voltage battery 60, the step-down converter 64, the 1MOT ECU 104, the 2MOT ECU 106, and the BAT ECU 108 (FIG. 2, etc.). However, the present invention is not limited to this structure from the viewpoint of using the bracket 146 for fixing the 1MOT ECU 104 and the 2MOT ECU 106, for example. It may be possible that the battery unit 84 does not include the step-down converter 64, for example. Alternatively, the battery unit 84 may include a part of the PCUs 62*a* to 62*c*.

In the above embodiment, the battery unit 84 is disposed behind the seat 160 (FIG. 2). However, the present invention is not limited to this structure from the viewpoint of using the bracket 146 for fixing the 1MOT ECU 104 and the 2MOT ECU 106, for example. The battery unit 84 may be disposed, for example, on the front side of the vehicle 10 (for example, at a position corresponding to the engine compartment).

[B-2-2. Bracket 146]

In the above embodiment, the 1MOT ECU 104 and the 2MOT ECU 106 are grounded through the bracket 146 to which the 1MOT ECU 104 and the 2MOT ECU 106 are fixed. However, the 1MOT ECU 104 and the 2MOT ECU 106 can alternatively be grounded through another member than the bracket 146.

In the above embodiment, the bracket 146 is hollow (more specifically, has a shape like a frame) (FIG. 5). However, the present invention is not limited to this structure from the viewpoint of fixing the 1MOT ECU 104 and the 2MOT ECU 106 to the bracket 146, for example. For example, the bracket 146 may have another shape than the hollow shape.

In the above embodiment, the first bolt holes 270*a*, 270*b* (first attachment holes) are disposed at opposite corner positions of the bracket 146 and the second bolt holes 272*a*, 272*b* (second attachment holes) are disposed at opposite corner positions of the bracket 146 (FIGS. 5 and 7). However, another arrangement may be employed from the viewpoint of fixing the 1MOT ECU 104 and the 2MOT ECU 106 to the bracket 146, for example.

In the present embodiment, the plate-shaped part 250 of the bracket 146, the 1MOT ECU 104, and the 2MOT ECU 106 are inclined so that a lower part thereof comes to the front side of the vehicle 10 more than an upper part thereof (FIG. 2). However, the present invention is not limited to this structure from the viewpoint of fixing the 1MOT ECU 104 and the 2MOT ECU 106 to the bracket 146, for example. The plate-shaped part 250, the 1MOT ECU 104, and the 2MOT ECU 106 may be disposed vertically, for example.

[B-2-3. Others]

In the above embodiment, the 1MOT ECU 104 and the 2MOT ECU 106 are fixed to the bracket 146 (FIG. 2, etc.). However, the present invention is not limited to this structure from the viewpoint of fixing the ECU to each of the first surface 280 and the second surface 282 of the bracket 146. For example, the 1MOT ECU 104 or the 2MOT ECU 106 may be fixed to the first surface 280 and the BAT ECU 108 may be fixed to the second surface 282. In this case, only one traction motor may be provided to the vehicle 10.

C. Explanation of Numerals

10: electric vehicle
34: first traction motor
52*a*, 52*b*: second traction motor
60: high-voltage battery (power storage device)
64: step-down converter (power conversion device)
84: battery unit (power storage unit)
104: 1MOT ECU (first computer)
106: 2MOT ECU (second computer)
146: bracket (support member)
160: seat
250: plate-shaped part
270*a*, 270*b*: first bolt hole (first attachment hole)
272*a*, 272*b*: second bolt hole (second attachment hole)
280: first surface
282: second surface

What is claimed is:

1. An electric vehicle, comprising:
   a first traction motor;
   a second traction motor; and
   a power storage unit configured to supply electric power to the first traction motor and the second traction motor;
   wherein the power storage unit comprises:
      a power storage device;
      a first computer configured to control the first traction motor;
      a second computer configured to control the second traction motor; and
      a support member including a first surface and a second surface opposite to the first surface, and
   wherein the power storage unit is disposed behind a seat of the electric vehicle,
   in a state that the first computer is fixed to the first surface of the support member and the second computer is fixed to the second surface, the support member is disposed between the seat and the power storage device in a front-rear direction of the electric vehicle,
   the support member includes a plate-shaped part including the first surface and the second surface;
   a plurality of attachment holes are formed respectively at four corners of the plate-shaped part;
   among the plurality of attachment holes, a first attachment hole and a second attachment hole are configured to attach the first computer;
   among the plurality of attachment holes, a third attachment hole and a fourth attachment hole are configured to attach the second computer; and
   a line connecting the first attachment hole and the second attachment hole intersects with a line connecting the third attachment hole and the fourth attachment hole.

2. The electric vehicle according to claim 1, wherein:
   the power storage unit includes a power conversion device configured to convert electric power output from the power storage device; and
   the power conversion device is disposed on an upper side of the power storage device.

3. The electric vehicle according to claim 1, wherein:
the support member is a conductive bracket;
the first computer and the second computer are configured to be grounded to the bracket; and
the bracket is configured to be grounded in a vehicle body directly or indirectly.

4. The electric vehicle according to claim 1, wherein the support member is hollow.

5. The electric vehicle according to claim 1, wherein:
the first computer and the second computer have a rectangular parallelepiped shape.

6. The electric vehicle according to claim 1, wherein:
the first computer and the second computer have a rectangular parallelepiped shape; and
each of the plate-shaped part of the support member, the first computer, and the second computer is inclined so that a lower part thereof is positioned toward a front side of the electric vehicle more than an upper part thereof.

7. An electric vehicle, comprising:
a first traction motor;
a second traction motor; and
a power storage unit configured to supply electric power to the first traction motor and the second traction motor;
wherein the power storage unit comprises:
 a power storage device;
 a first computer configured to control the first traction motor;
 a second computer configured to control the second traction motor; and
 a support member including a first surface and a second surface opposite to the first surface, and
wherein the power storage unit is disposed behind a seat of the electric vehicle, and
 in a state that the first computer is fixed to the first surface of the support member and the second computer is fixed to the second surface, the support member is disposed between the seat and the power storage device in a front-rear direction of the electric vehicle,
a plurality of attachment holes are formed respectively in the support member;
among the plurality of attachment holes, a first attachment hole and a second attachment hole are configured to attach the first computer;
among the plurality of attachment holes, a third attachment hole and a fourth attachment hole are configured to attach the second computer; and
a line connecting the first attachment hole and the second attachment hole intersects with a line connecting the third attachment hole and the fourth attachment hole.

8. The electric vehicle according to claim 7, wherein:
the power storage unit includes a power conversion device configured to convert electric power output from the power storage device; and
the power conversion device is disposed on an upper side of the power storage device.

9. The electric vehicle according to claim 7, wherein:
the support member is a conductive bracket;
the first computer and the second computer are configured to be grounded to the bracket; and
the bracket is configured to be grounded in a vehicle body directly or indirectly.

10. The electric vehicle according to claim 7, wherein the support member is hollow.

11. The electric vehicle according to claim 7, wherein the first computer and the second computer have a rectangular parallelepiped shape.

12. The electric vehicle according to claim 7, wherein:
the first computer and the second computer have a rectangular parallelepiped shape;
the support member comprises a plate-shaped part including the first surface and the second surface; and
each of the plate-shaped part of the support member, the first computer, and the second computer is inclined so that a lower part thereof is positioned toward a front side of the electric vehicle more than an upper part thereof.

* * * * *